Aug. 14, 1923. Re. 15,674

G. C. LAWSON

PIPE WRENCH

Original Filed May 10, 1920

G. C. LAWSON INVENTOR.

BY Richey, Slough + Watts

HIS ATTORNEYS

Reissued Aug. 14, 1923. Re. 15,674

UNITED STATES PATENT OFFICE.

GOTTFRID C. LAWSON, OF CLEVELAND, OHIO.

PIPE WRENCH.

Original No. 1,362,014, dated December 14, 1920, Serial No. 380,101, filed May 10, 1920. Application for reissue filed December 13, 1922. Serial No. 606,737.

*To all whom it may concern:*

Be it known that I, GOTTFRID C. LAWSON, a citizen of the United States, residing at Cleveland, in the county of Cuyahoga and State of Ohio, have invented certain new and useful Improvements in Pipe Wrenches, of which the following is a specification.

This invention relates to wrenches, and particularly to pipe wrenches of the adjustable jaw type, the outer jaw being adjustable and the inner jaw being rigid or integral with the handle.

The object of the invention is to provide an improved wrench in which the outer jaw will have a free rocking movement to take hold of and release the pipe, a fulcrum being provided in the head of the wrench on which the adjustable jaw rocks, this fulcrum being located in particular relation to the depth of the jaws, in order to get a good hold on a large sized pipe and to release freely without binding when the pressure of the handle is released.

The axis of the handle is placed at a particular and convenient angle to the axis of the jaws, in order to provide for most effective operation in narrow spaces. A further object of the invention is to provide improved means for holding the adjusting nut in desired position, so that the adjustment of the outer jaw will not change during use. Various other features of improvement will be apparent from the following description.

Figure 1:
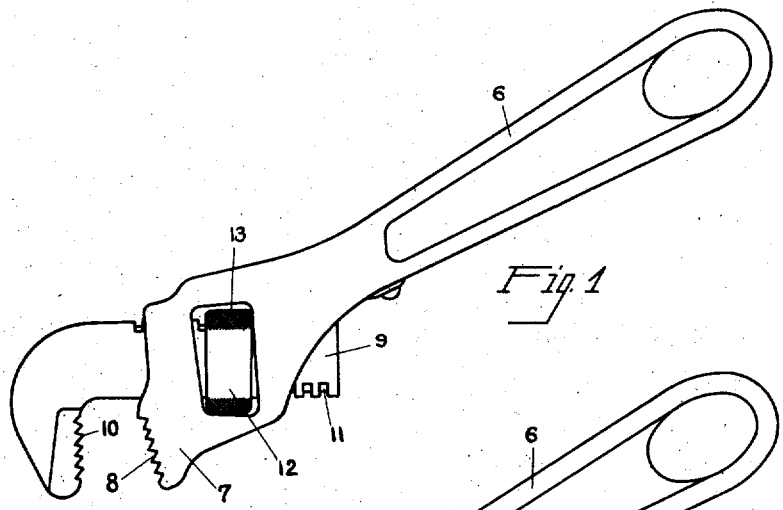
Figure 2:
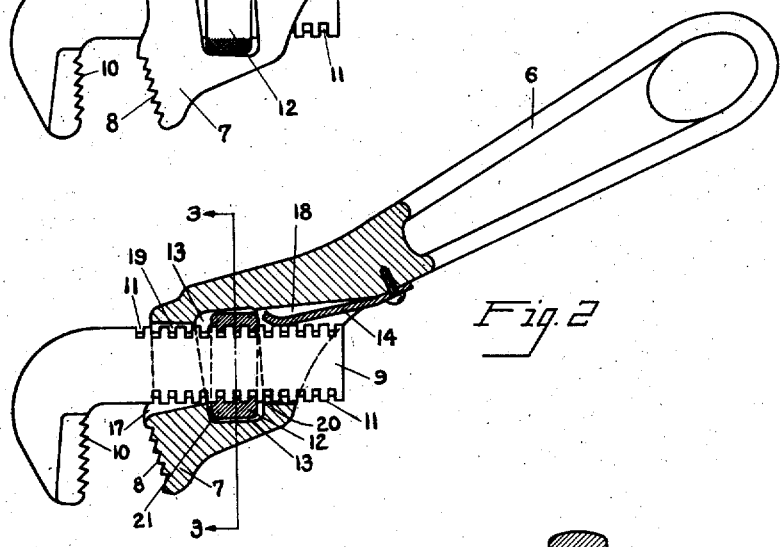
Figure 4:
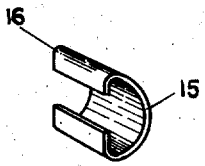
Figure 3:
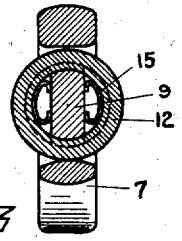

In the accompanying drawings Figure 1 is a plan of the wrench. Fig. 2 is a longitudinal section. Fig. 3 is a cross section on the line 3—3 of Fig. 2. Fig. 4 is a detail of a spring.

Referring specifically to the drawings, 6 indicates the handle of the wrench, terminated at its front end in a head 7 provided with a fixed jaw 8 which is presented at a slight inclination to a perpendicular from the axis of the handle, so that the two jaws will have an angle of about 115°, to said axis, as it has been found that this angle is a most convenient one for operating the wrench, and gives a wider range of use in a smaller space than other angles. The head is slotted lengthwise to receive the shank 9 of the outer adjustable jaw 10, the axis of said shank being perpendicular to the face of said jaw. The shank has racks 11 at its front and rear edges, and these racks are engaged by a ring nut 12 set in a cross recess or slot 13 in the head. A flat spring 14 bears against the edge of the shank near the inner end thereof and normally holds the jaw in open position. Within the ring nut 12, at each side of the shank 9 is a C-spring 15, the back of which bears against the inner surface of the nut and the ends which bear against the sides of the shank, these ends being bent inwardly as shown at 16. The pressure of these springs between the parts by which they are confined is sufficient to prevent accidental movement of the nut, and permits the nut to be turned for adjustment when desired.

The shape of the slot through the head is peculiar, and is of importance. At its front end the slot is flared or widened as indicated at 17, in the plane of the jaws, and at its rear end it is also widened, as indicated at 18, in the same plane. The widened part 17 at the front end is located at the front side of the handle, or the side toward the jaws, while the widened part 18 is located on the opposite or rear side of the handle, and the surface 19, opposite the widened part 17, and the surface 20, opposite the widened part 18, are substantially parallel to each other, or at very slight angle to each other. Similarly surfaces 17 and 18 are substantially parallel or at a very slight angle to each other. This structure in connection with the cross slot 13 produces a fulcrum point or shoulder at 21 on which the nut rocks. The cross slot 13 in which the nut works, tapers in a plane parallel to the plane of the jaws; i. e., this slot is somewhat wider at the back side of the wrench than at the front whereby the nut can rock while retaining, however, its contact with the front wall of the slot 13. It will be noted that the cross-slot 13 extends beyond the front side of the handle beyond the rear end $8^a$ of the fixed jaw 8 and that nut 12 pivotally engages the front wall of slot 13 near the extreme front end thereof forwardly of the rear end $8^a$ of the fixed jaw 8.

This construction has been found most advantageous for the operation of the wrench, particularly when extended to full size. There is no looseness permitting the wrench to enlarge after it is adjusted since the shank has close fitting engagement in the constricted portion of the longitudinal slot, but still the nut and the adjustable jaw can rock on the fulcrum to take hold of and release from the work. When the nut is set for adjustment it works against the shoulder 21, and when applied to the work will rock under pressure to grip the work, the front end of the shank swinging down in the enlarged part 17 of the longitudinal slot until finally it comes in contact with the head, with the nut in contact at front and back with the front surface of the cross slot 13, which makes a very rigid structure, the nut rocking on the shoulder 21 as a fulcrum. When the pressure is released the flat spring 14 rocks the adjustable jaw the other way and quickly releases the grip. Spring 14 thus cooperates with the constriction of the longitudinal slot to maintain the nut 12 in engagement with the front wall of slot 13 at all times, the close fitting engagement of the slot preventing rearward shifting of the shank and of the nut in slot 13 and the spring pressing the nut into contact with the front wall of the slot 13. The function of the C-springs 15 in holding the nut at adjustment has been previously referred to.

The invention is not limited to the exact form shown, but modifications may be made within the scope of the following claims.

I claim:

1. A wrench having a slotted fixed jaw and handle, an adjustable jaw having a rack shank in said slot, a ring nut engaging the rack of the shank, and a pair of C-springs confined in the nut and bearing at their ends against opposite sides of the shank respectively.

2. A wrench having a slotted fixed jaw and handle, an adjustable jaw having a rack shank in said slot, a ring nut engaging the rack of the shank, and a pair of C-springs confined in the nut and bearing at their ends against opposite sides of the shank respectively, the backs of the springs bearing against the inside of the nut and the ends of the springs being bent inwardly where they bear against the shank.

3. A wrench comprising a handle having a grip portion and a projection extending laterally from one end thereof, a surface constituting a fixed jaw formed on the said projection and inclined at an obtuse angle to the longitudinal axis of the grip portion, the handle having a lengthwise slot extending transversely thereof between the grip portion and the fixed jaw at an angle of less than about 30° to the longitudinal axis of the grip portion, the said slot being constricted intermediate its ends by having pairs of inwardly converging side walls lying in the plane of the fixed jaw, each wall of one pair of said side walls being substantially parallel with the oppositely disposed wall of the other pair of side walls, the handle having a cross slot intersecting the said lengthwise slot and extending therebeyond on the side adjacent the said fixed jaw, the forward wall of the said cross slot diverging uniformly with respect to the rearward wall from its end adjacent the fixed jaw to the remote end thereof, a movable jaw comprising a jaw surface and a rack bearing shank at substantially right angles thereto, the said shank having close fitting engagement in the constricted part of the said lengthwise slot, a nut on the said shank in pivotal engagement with the extreme end of the forward wall of the cross slot adjacent the said fixed jaw, and spring means contacting with the shank to separate the said jaws and press the nut into the aforesaid pivotal engagement with the forward wall of the cross slot.

4. A wrench having a handle provided with intersecting longitudinal and cross slots, a grip portion and a fixed jaw; the longitudinal slot extending transversely of the handle between the grip portion and fixed jaw being interiorly constricted and formed with pairs of inwardly converging side walls, one wall of each pair being substantially parallel with the oppositely disposed wall of the other pair of walls; the cross slot having its front wall extending in the front side of the handle beyond the rear end of the fixed jaw, a movable jaw with a rack bearing shank having close fitting engagement in the constriction of the longitudinal slot, a nut on the shank and in the cross slot, and spring means cooperating with the constriction of the longitudinal slot to maintain pivotal contact of the nut on the front wall of the cross slot forwardly of the rear end of the fixed jaw.

5. A wrench comprising a fixed jaw carrying handle having intersecting longitudinal and cross slots, the longitudinal slot being constricted intermediate its ends; the cross slot extending toward the front side of the handle beyond the rear end of the fixed jaw; a movable jaw with a rack bearing shank having close fitting engagement in the constriction of the longitudinal slot; a nut in the cross slot on the shank, and spring means engaging the said shank and cooperating with the constriction of the longitudinal slot to maintain pivotal contact of the nut on the front wall of the cross slot forwardly of the rear end of the fixed jaw.

In testimony whereof I do affix my signature hereto.

GOTTFRID C. LAWSON.